Sept. 6, 1966    W. J. ELLIS ETAL    3,271,458
COOLING AND CATALYST RECYCLE IN OXO SYNTHESIS
Filed Nov. 23, 1962
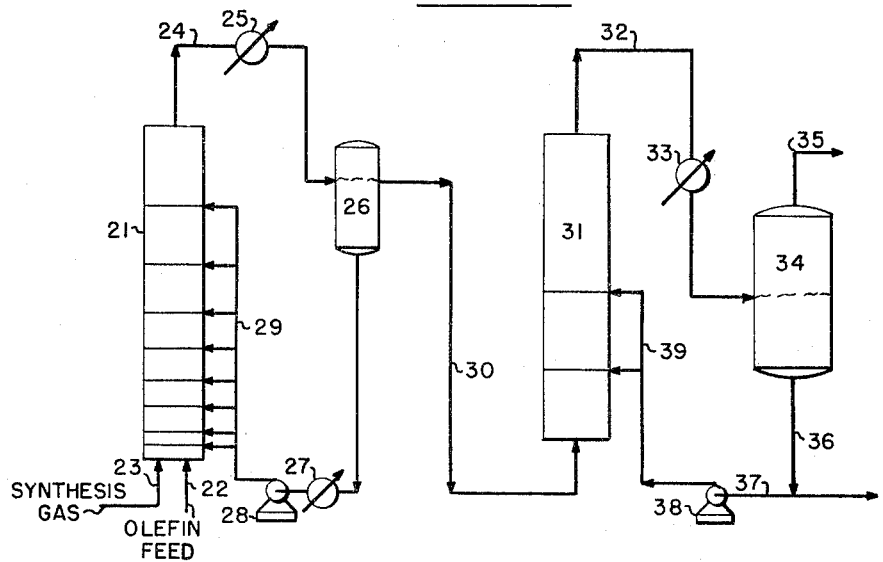
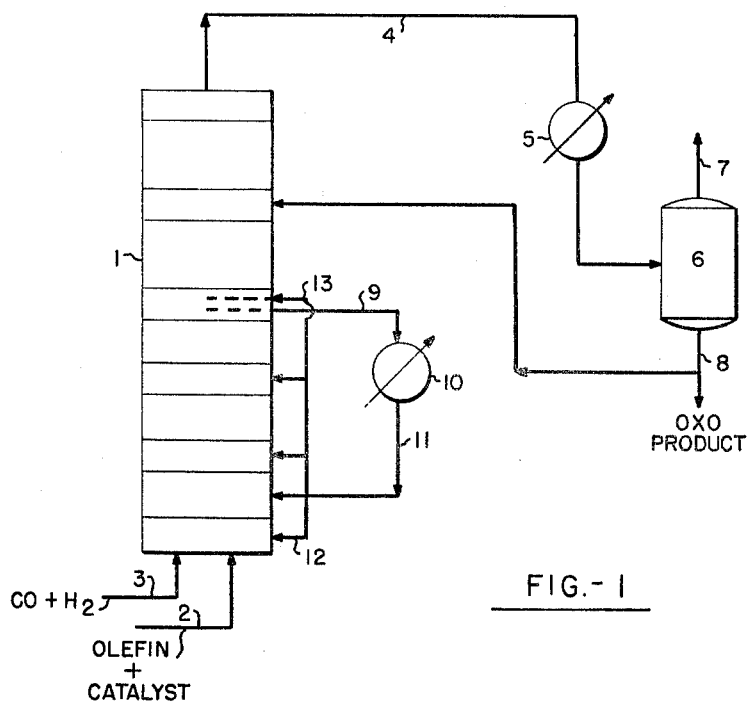
William J. Ellis
Charles Roming, Jr.    Inventors
By Frank A. Sinnock
Patent Attorney 3,271,458
COOLING AND CATALYST RECYCLE IN
OXO SYNTHESIS
William J. Ellis, Dover, and Charles Roming, Jr., Towaco,
N.J., assignors to Esso Research and Engineering Company, a corporation of Delaware
Filed Nov. 23, 1962, Ser. No. 239,558
17 Claims. (Cl. 260—604)

The present invention relates to the preparation of oxygenated organic compounds by the reaction of carbon compounds containing olefinic linkages with hydrogen and carbon monoxide in the presence of a carbonylation catalyst. More specifically, this invention relates to an improved process for controlling the heat of reaction in the carbonylation reaction zone and to increasing the reaction rate of the carbonylation in said zone.

It is well known in the art that oxygenated organic compounds may be synthesized from organic compounds containing olefinic linkages by a reaction with carbon monoxide and hydrogen in the presence of a carbonylation catalyst in a two-step process in which predominantly aldehydes and minor proportions of ketones and alcohols are formed in a first step in the presence of a carbonylation catalyst, and the products from the first step may then be hydrogenated in a second step to convert the organic carbonyl compounds containing one more carbon atom than the olefinic starting material to the corresponding alcohol. Likewise, if desired, the aldehydes may be converted to the corresponding fatty acids by oxidation. The second step hydrogenation catalyst may comprise any known reduction catalyst, such as metallic supported or unsupported nickel, copper chromite, sulfactive catalysts, such as oxides and sulfides of tungsten, nickel and molybdenum, and the like.

This carbonylation or oxo reaction, by which name this process is generally known, provides a particularly attractive method of preparing primary alcohols to supply the large market for plasticizers, detergents, solvents and the like. Amenable to the reaction are long and short chained olefinic compounds, not only hydrocarbons, but most other organic compounds having a carbon-to-carbon olefinic linkage, such as unsaturated alcohols, acids, esters and the like. Straight and branch chained olefins and diolefins, such as propylene, butene, butadiene, pentene, pentadiene, hexene, heptene, styrene, olefin polymers, such as di and triisobutylene hexene and heptene dimers, polypropylenes, olefinic fractions from the hydrocarbon synthesis process, thermal or catalytic cracking operations and other sources of hydrocarbon fractions containing such olefins may be used as starting materials, depending on the nature of the final product desired.

The catalyst for the first step of the process is usually employed in the form of an oil soluble compound of the catalytically active carbonylation metal. Thus, there have been employed the salts of the metals, such as iron or cobalt, and high molecular weight fatty acids, such as stearic, oleic, naphthenic, linoleic, and the like. Catalyst concentrations may vary from about 0.5 to 5.0% by weight of the catalyst salt based on the olefinic feed.

It has been found that high olefin conversions can be achieved by employing a plurality of carbonylation zones, i.e. at least a two-stage rather than a single-stage oxonation system. Reaction conditions in the both stages include the normally high pressures associated with the oxo reaction itself, i.e. 500–4500 p.s.i.g. Temperatures in the first stage can be lower than those employed in a one-stage oxonation system, usually being less than 350° F. and preferably around 300° F. In the second stage, a considerably higher linear feed velocity is employed in comparison with the first stage, usually at a temperature dictated by the stability of the catalyst at the pressure being employed.

Cooling has been accomplished by injection of cooled recycle synthesis gas into the oxo reactor. This process is unsatisfactory because at the relatively low temperature levels of the carbonylation reaction and the restricted temperature gradient within each reactor, usually less than about 100° F., there are required excessively large amounts of cooling gas, on the order of about 25,000–100,000 cubic feet per barrel of olefin treated. This cooling gas must also first be scrubbed with suitable liquid to remove cobalt carbonyl to prevent line plugging and, thus, high gas rates would mean large quantities of scrubbing liquid which must subsequently be run through a catalyst removal zone.

One good method for controlling the heat of reaction and for providing active catalyst in the lower portion of the reactor is to recycle a portion of the final second step oxo product (i.e. aldehyde containing cobalt carbonyl in solution), after cooling and separation of gases in a high pressure separator. This final aldehyde product has a much higher heat capacity than an equivalent volume of gas and, hence, a substantially smaller amount is required for recycling. Also, since the aldehyde recycled contains dissolved catalyst, recycle of this material to the lower portion of the first stage reaction zone provides a high concentration of the catalytic material near the reactor inlet where it is capable of accomplishing a large degree of reaction before cobalt salts introduced to the reactor dissolved in the fresh feed are converted to cobalt carbonyl and are able to function as catalysts.

This process, though a considerable step forward, has the disadvantage that the recycled aldehyde product is maintained for a substantial length of time at the elevated pressures and temperatures existing in the primary carbonylation zone. Thus, under the influence of heat, secondary reactions of the aldehyde product, such as aldolization, polymerization, Cannizzaro-type reactions, etc., are favored.

It is one of the objects of the present invention to disclose an improved process whereby the heat of the reaction in an aldehyde synthesis process may be advantageously controlled without recirculating large volumes of cooling gases.

It is another object of the present invention to suppress the formation of secondary reaction products, such as acetals resulting from the interaction of aldehydes and alcohols, within the reaction zone.

A further purpose of the present invention is to disclose a means whereby high catalyst concentrations may be maintained throughout the entire reactor with resulting increase in the reaction rate.

A further purpose of the present invention is to disclose a process for utilizing to maximum efficiency the catalyst employed in the process.

Other and further objects and advantages of the invention will be in part obvious and will in part appear hereinafter.

These objects and advantages may, in accordance with the present invention, be achieved by employing a process wherein an olefin, carbon monoxide and hydrogen are contacted in a carbonylation zone with an oxo catalyst under conditions to produce an oxygenated reaction product comprising in part an aldehyde. An effluent stream is continually withdrawn from the carbonylation zone, such stream having an olefin content higher than the final oxygenated reaction product. A portion of the effluent stream is cooled and recycled to the carbonylation zone where at least a portion of the cooled recycled stream is injected into the carbonylation zone at a point closer to the fresh feed injection point whereby a higher concentration of olefin is maintained in the carbonylation zone than if the final product were recycled, and whereby cooling for said process is provided.

It has been reasonably well substantiated that the carbonylation reaction is psuedo first order in olefin concentration. That is, the reaction rate at a fixed set of conditions can be expressed as $$-\frac{dc}{dt} = Kc$$

where $c$ represents olefin concentration. Consequently, the overall reaction rate in the carbonylation zone can be increased by employing a reactant feed in which the olefin concentration therein is maintained at a high level. The following data, the result of extensive kinetic studies, illustrate the difference in reaction rates under similar conditions of various olefin concentrations in reactant feeds. The conditions reproduced were a 2:1 $H_2$/CO gas ratio; 0.2 weight percent of cobalt as catalyst based on the olefin feed; and a reactor pressure of 1200 p.s.i.g. The olefin feed and reactor temperature were as hereinafter set for each run reproduced. Therefore, for an experiment employing UOP heptene feed at 300° F., the results were as follows:

UOP HEPTENE FEED AT 300° F.

| Mole fraction feed: | Reaction rate, moles converted/hr./ft.$^3$ |
|---|---|
| 0.2 | 0.05 |
| 0.5 | 0.12 |
| 0.8 | 0.20 |
| 1.0 | 0.26 |

Employing the results obtained above and results similarly obtained in the rate equation set forth above, the following reaction rate constants (K) were obtained:

REACTION RATE CONSTANT (K)

| Rate Constant, Hrs.$^{-1}$ | UOP Heptenes | Propylene | UOP Tetramer |
|---|---|---|---|
| 300° F | 0.66 | 5.62 | 0.18 |
| 280° F | 0.42 | 3.58 | 0.12 |
| 260° F | 0.26 | 2.22 | 0.07 |

Thus, it is apparent from the foregoing data that an effluent stream withdrawn before complete reaction from the carbonylation zone and recycled into the initial stages of said zone increases the overall reaction rate, inasmuch as most of the reaction proceeds in the presence of a higher concentration of olefin than with recycle of the final product. Further advantage can be accomplished if the recycled stream is cooled prior to injection into the carbonylation zone. By such practice, the reaction rate is not only increased, but coolant for the carbonylation zone is also provided. Even further advantage is accomplished if two or more carbonylation reactors are employed in series as the effective residence time in all reactors subsequent to the first is higher since the coolant employed in each reactor is not fed to subsequent reactors.

The present invention will best be understood from the more detailed description presented hereinafter, wherein reference will be made to the accompanying drawings which are schematic illustrations of systems suitable for carrying out preferred embodiments of the invention.

In FIGURE 1 there is shown an embodiment wherein an olefin-rich effluent stream is withdrawn from the carbonylation reactor, cooled, and subsequently recycled to the reactor to provide high olefin concentration while maintaining temperature control.

In FIGURE 2 there is shown an embodiment of the present invention wherein two carbonylation reactors are employed and wherein an olefin-rich effluent stream is withdrawn from each reactor, cooled, and is recycled to the respective reactors.

Referring first to FIGURE 1, an olefinic hydrocarbon having one carbon atom less than the number of carbon atoms in the desired resulting oxygenated compound is fed through feed line 2 to the bottom portion of primary reactor 1. Reactor 1 comprises a reaction vessel which may, if desired, be packed with noncatalytic material, such as Raschig rings, porcelain chips, ceramic material, pumice, and the like. Reactor 1 may be divided into discrete packed zones separated by any suitable means, such as support grids, etc., or it may comprise but a single packed zone, or it may contain no packing.

Also passed into reactor 1 is an oxo catalyst and, if desired, an oil soluble aldox reaction modifier, as described in U.S. Patent 2,811,567. In a preferred modification, a mixture of cobalt and the reaction modifier is employed dissolved in the olefin feed and is admitted through line 2. It is to be understood that other forms of cobalt, such as an aqueous solution of a cobalt salt, i.e. cobalt acetate, or a slurry of oil insoluble cobalt solids, such as cobalt oxide, metal carbonate, and the like, may be employed. Cobalt is generally added, preferably to the extent of 0.1 wt. percent to 1.0 wt. percent or 0.01 to 0.12 mole/liter calculated as metal on olefin feed. If an aldox modifier, i.e. Group II, IV, or VI metals such as zinc or magnesium, tin or chromium, etc., salt of a fatty acid, i.e. oleic stearic, naphthenic, etc., is employed, such compound is preferably added to the extent of 0.2–2.0:1 based on cobalt.

Simultaneously, a gas mixture containing hydrogen and carbon monoxide in the approximate ratio of 0.5 to 2.0 volumes, preferably 1.25 to 1.75 volumes of hydrogen per volume of carbon monoxide is supplied through line 3 to primary reactor 1 and flows concurrently through reactor 1 with said olefin feed. Reactor 1 is generally operated at a pressure of about 500–4500 p.s.i.g., preferably 1000–3500 p.s.i.g., and at a temperature of from 150° to 450° F., preferably 220° to 380° F., depending upon the olefin feed and other reaction conditions. The rate of flow of synthesis gas and olefins through reactor 1 is so regulated that the desired conversion level of the olefin is obtained.

The carbonylation reaction in reactor 1 is carried out substantially adiabatically, that is, no external cooling means, such as by tubes or coils, is required except means for cooling and temperature control, as carried out in the process of the present invention disclosed below.

Liquid oxygenated reaction products comprising aldehydes are withdrawn from the upper portion of reactor 1 through line 4. The product which is generally at a temperature of about 240° to 400° F. is then passed to cooler 5 where the temperature is lowered to about 80° to 160° F., and then passed to high pressure gas-liquid separator 6. Herein separation of unreacted gases from liquid product occurs. The unreacted gases may be withdrawn through line 7 and after scrubbing may be recycled to the system or in part purged. Liquid aldehyde product containing high concentration of active catalyst compound, e.g. cobalt carbonyl, is withdrawn from the high pressure separator 6 through line 8.

In accordance with the present invention, an effluent stream comprising about 20 to 90% by volume, and preferably 50 to 85% by volume, of the internal reaction stream is withdrawn from the reactor 1 through line 9. Said effluent stream has an olefin conversion level of from about 10 to 80 mole percent and preferably 40 to 70 mole percent. The stream is passed through line 9 to cooler 10 where the temperature of the stream is lowered to about 80° to 160° F. and is then recycled to reactor 1 wherein it is injected into a first cooling section of the reactor 1 near the fresh olefin feed inlet 2 and also injected at other points along the direction of flow of the reaction products to obtain closer temperature control through the reactor through manifold 11. Approximately a total of 50 to 100 volume percent of recycled effluent stream may be used for temperature control, and the remainder used to provide catalyst enrichment, adjust heat capacity, etc. of the feed via line 12.

As illustrated in FIGURE 1, it is also within the ambit of the present invention to provide for the injection of a portion of the cooled recycle stream into the carbonylation zone at an injection point 13 set further along the direction of flow of the reaction products than the point at which the effluent stream is withdrawn from said carbonylation zone through line 9.

An effective embodiment of the present invention involves the use of two or more reactors operating in series. FIGURE 2 illustrates the process of the present invention employing two reactors in series. In this embodiment, olefinic hydrocarbon feed is fed through feed line 22 to the bottom of the first or primary reactor 21. Also passed into reactor 21 through line 22 is an oxo catalyst, as set forth above, and, if desired, an aldox reaction modifier. Simultaneously, a gas mixture containing $H_2$ and CO in the approximate ratio of 0.5 to 2.0 volumes $H_2$ per mole CO is supplied through line 23 and flows concurrently with the olefinic and resulting aldehyde product upwardly through reactor 21. The latter is preferably operated at pressures of about 1000–3200 p.s.i.g. and temperatures of 220° to 380° F. The residence time of the reactants in the reactor 21 is such as to convert a portion of the olefin feed to aldehyde product. Generally, the olefin conversion in the initial reaction zone is from about 40 to 70 mole percent if two reactors are used.

The liquid partially oxygenated reaction product is continuously withdrawn from the upper portion of primary reactor 21 through line 24. The product, which is at a temperature of about 240° to 400° F., is then passed to cooler 25 where the temperature is lowered by about 30° to 80° F. and then passed to separator 26. Herein separation of the stream occurs with a portion of said stream being further cooled in cooler 27 to a temperature of 80° to 160° F., if desired, and subsequently recycled to reactor 21 through pump 28. The recycled portion of the stream is injected into a first cooling section of the reactor, near the olefin feed inlet 22, and also into other sections in addition to obtain close control of temperature and while maintaining high olefin concentration throughout the reactor through manifold 29. Generally, from 20 to 90 volume percent, and preferably 50 to 85 volume percent, of the effluent stream from initial reactor 21 is recycled back to the reactor.

The remaining portion of the stream from separator 26 is fed through line 30 to the bottom of final reactor 31. The latter is preferably operated at pressures of about 1000 to 3500 p.s.i.g. and temperatures of 240° to 380° F. The residence time of the reactants in final reactor 31 is such as to effect a substantial conversion of the olefin feed introduced to aldehyde product. Generally, the conversion of the olefin entering the final zone is from about 40 to 90 mole percent, giving an overall olefin conversion in both zones of about 70 to 98 mole percent.

The liquid oxygenated reaction product is continuously withdrawn from the upper portion of final reactor 31 through line 32. The product which is at a temperature of about 240° to 380° F. is then passed to cooler 33 where the temperature is lowered to about 80° to 160° F. and then passed to high pressure gas liquid separator 34. Herein separation of unreacted gases from liquid product occurs. The unreacted gases may be withdrawn through line 35 and, after scrubbing, may be recycled to the system or in part purged. Liquid product is withdrawn from high pressure separator 34 through line 36. A portion of this stream is passed via line 37, preferably through pump 38 to final aldehyde synthesis reactor 31 for reasons hereinbefore described, the amount of product generally recycled to reactor 31 being from 50 to 90 volume percent of the total effluent stream from said reactor.

The systems illustrated in the drawings and in the foregoing description permit of various modifications without departure from the spirit of the invention. Thus, in one embodiment the invention may be practiced with indirect cooling of the reactors, i.e. use of internal cooling coils with indirect water or oil cooling in any reactor subsequent to the first. In another embodiment, a portion of the product from primary reactor 21 in line 24 may be by-passed around cooler 25 and separator 26 and recombined with stream 30 prior to final reactor 31. In this instance, cooler 25 would cool stream 24 to a temperature of about 80° to 160° F. and cooler 27 would be eliminated.

The aldehyde product resulting from the process of the present invention can then be hydrogenated, under conventional conditions to produce alcohols or, if desired, may be converted to fatty acids by oxidation.

The process of the present invention may be further illustrated by the following specific examples:

*Example I*

To demonstrate the feasibility of employing a concentrated olefin recycle on a pilot plant scale, allowable feed rates were calculated from kinetic equations comparing the process of the present invention with the prior are processes.

Data were based on the use of two reactors in series and in pilot plant scale. UOP heptenes feed were employed, mixed with 0.2 weight percent cobalt. Hydrogen and carbon monoxide were introduced to the initial reaction in a mole ratio of 2:1. The reaction conditions were based on a reactor pressure of 1200 p.s.i.g. and a temperature of 260–320° F. (300° F. mean temp.). Desired conversion was set at 86.5 mole percent conversion of the olefin feed. Recycle temperature in all instance was 110° F. The following Table I shows the superiority of the recycle of the instant invention.

TABLE I

| Case | Configuration | Allowable Feed Rate v./hr./v., hr.⁻¹ | Mole Percent Feed Olefin Converted Outlet of Reactor | | Recycle B/B Fresh Feed at 110° F. | |
|---|---|---|---|---|---|---|
| | | | 1st | 2nd | 1st | 2nd |
| A | Theoretical, plug flow, isothermal reactor. | 0.33 | | 86.5 | | |
| B | Past practice, final product recycle to both reactors. | 0.16 | 60 | 86.5 | 2.6 | 1.1 |
| C | Invention, intermediate product (conc. olefin) recycle to 1st reactor. | 0.23 | 60 | 86.5 | 2.6 | 0.9 |

The above data indicate that by using concentrated olefin recycle (Case C) the reactor volume required to obtain 86.5 mole percent conversion of olefin may be reduced to about 70% of the volume required by the prior art processes (Case B).

*Example II*

In order to demonstrate the feasibility of employing a concentrated olefin recycle on a system in which a plurality of reactors are employed, a system in which these reactors were of somewhat similar size was reproduced in a manner analogous to the method of Example I.

Data were based on the use of UOP tetramer ($C_{12}$=olefin) mixed with 0.4 weight percent cobalt. The reaction conditions were based on a $H_2/CO$ ratio of 1.7 to 1 and a reactor pressure of 1200 p.s.i.g. and mean temperature of 280° F. Desired conversion was set at 71 mole percent conversion of the olefin feed. The recycle temperature in each case was 110° F. The following Table II illustrates the superiority of the recycle of the present invention in a three reactor system.

TABLE II

| Case | Configuration | Allowable Feed Rate v./hr./v., hr.⁻¹ | Mole Percent Feed Olefin Converted Outlet of | | | Recycle B/B Fresh Feed at 110° F. | | |
|------|---------------|--------------------------------------|---|---|---|---|---|---|
|      |               |                                      | 1st | 2nd | 3rd | 1st | 2nd | 3rd |
| A    | Theoretical, plug flow isothermal reactor. | 0.192 |   |   | 71 |   |   |   |
| B    | Past Practice, final prod. recycle to all three reactors. | 0.116 | 32 | 55 | 71 | 1.3 | 1.2 | 1.0 |
| C    | Invention, intermediate prod. recycle to 1st and 2nd reactors. | 0.146 | 32 | 55 | 71 | 1.2 | 0.9 | 0.7 |

The above data indicate that the reactor volume may be reduced to about 80% of the volume required by the prior art processes (Case B).

While the foregoing description and exemplary operations have served to illustrate specific applications and results, the invention is not limited thereto. Other modifications may appear to those skilled in the art without deviating from the spirit of the invention.

What is claimed is:

1. In an oxo process wherein an olefin, carbon monoxide and hydrogen are contacted in a carbonylation zone with an oxo catalyst under conditions to produce an oxygenated reaction product comprising an aldehyde, the improvement which comprises withdrawing from said carbonylation zone an effluent stream having an olefin content higher than the final oxygenated reaction product, cooling and recycling about 20 to 90% by volume of said stream to said carbonylation zone, and injecting at least a portion of the cooled recycle stream into the initial stages of said carbonylation zone.

2. The process of claim 1 in which further portions of said cooled recycle stream are injected into said carbonylation zone at a plurality of injection points spaced in the direction of flow of said reaction products through said carbonylation zone.

3. The process of claim 2 in which a portion of said cooled recycle stream is injected into the carbonylation zone at a point spaced further along the direction of flow of the reaction products than the point at which the effluent stream is withdrawn from said carbonylation zone.

4. The process of claim 1 in which the effluent stream has an olefin conversion level of from about 60 to 98 mole percent.

5. The process of claim 1 in which the temperature gradient existing in said carbonylation zone is in the range of from about 10° to about 80° F.

6. The process of claim 1 in which said recycle stream is cooled to a temperature in the range of from about 80° to about 160° F.

7. The process of claim 1 in which the pressure maintained in the carbonylation zone is from 500 to about 4500 p.s.i.g.

8. The process of claim 1 in which an aldox reaction modifier is employed with said oxo catalyst.

9. A continuous oxo process for the production of an aldehyde which comprises continuously passing an olefin feed, carbon monoxide, hydrogen and an oxo catalyst into an initial carbonylation zone under elevated temperatures and pressures, maintaining a residence time sufficient to convert a portion of the olefin feed to aldehyde product continuously, withdrawing an effluent stream from said initial carbonylation zone, cooling and recycling about 20 to 90% by volume of said effluent stream to said initial carbonylation zone, and injecting at least a portion of said stream into said zone at a point close to a fresh olefinic feed injection point, continually passing a portion of said effluent stream into a final carbonylation zone under elevated temperatures and pressures, withdrawing a final effluent stream rich in aldehydes from said zone, cooling and separating uncondensed gases and liquid product from the final effluent stream and recycling at least a portion of said final effluent stream to said final carbonylation zone and injecting at least a portion of said stream into said zone at a point close to an initial feed point.

10. The process of claim 9 in which further portions of said recycled streams are injected into the respective carbonylation zones at a plurality of injection points spaced in the direction of flow of said products through said carbonylation zones.

11. The process of claim 9 in which a portion of each of said recycle streams are injected into each respective carbonylation zone at a point spaced further along the direction of flow of the reaction products than the point at which each effluent stream is withdrawn from each of said carbonylation zones.

12. The process of claim 9 in which the conversion of olefins in the initial carbonylation zone is from 20 to 70 mole percent and in the final carbonylation zone is from 40 to 98 mole percent.

13. The process of claim 9 in which the temperature gradient existing in both carbonylation zones is in the range of from 10° to about 80° F.

14. The process of claim 9 in which the pressure maintained in each of the carbonylation zones is from 1000 to about 3500 p.s.i.g.

15. The process of claim 9 in which from 50 to 90 volume percent of the effluent stream from the initial reactor is recycled, and from 30 to 80 volume percent of the effluent stream from the final reactor is recycled.

16. The process of claim 9 in which a zinc comprising reaction modifier is employed with said oxo catalyst.

17. The process of claim 9 in which more than two carbonylation zones are utilized.

References Cited by the Examiner

UNITED STATES PATENTS

| | | | |
|---|---|---|---|
| 2,757,202 | 7/1956 | Mertzweiller et al. | 260—604 X |
| 2,811,567 | 10/1957 | Mason | 260—604 X |
| 2,878,108 | 3/1959 | Chandler | 260—604 X |
| 2,894,990 | 7/1959 | Weinerberg et al. | 260—604 X |

FOREIGN PATENTS 657,526   9/1951   Great Britain.

OTHER REFERENCES

Rehn et al.: German application 1,085,144, printed July 14, 1960, 4 pages spec., 1 sheet drawing.

LEON ZITVER, *Primary Examiner.*

B. HELFIN, R. H. LILES, *Assistant Examiners.*